F. B. WILDMAN.
SELF COMPENSATING DOGS FOR CIRCULAR KNITTING MACHINES.
APPLICATION FILED FEB. 3, 1915.

1,166,290.

Patented Dec. 28, 1915.

Attest:
Ewd L. Tolson
C. E. Parsons

Inventor:
Frank B. Wildman,
by Spear, Middleton, Donaldson & Spear
Atty's.

UNITED STATES PATENT OFFICE.

FRANK B. WILDMAN, OF NORRISTOWN, PENNSYLVANIA, ASSIGNOR TO WILDMAN MFG. CO., OF NORRISTOWN, PENNSYLVANIA, A CORPORATION OF PENNSYLVANIA.

SELF-COMPENSATING DOGS FOR CIRCULAR-KNITTING MACHINES.

1,166,290. Specification of Letters Patent. Patented Dec. 28, 1915.

Application filed February 3, 1915. Serial No. 5,967.

*To all whom it may concern:*

Be it known that I, FRANK B. WILDMAN, a citizen of the United States, residing at Norristown, Pennsylvania, have invented certain new and useful Improvements in Self-Compensating Dogs for Circular-Knitting Machines, of which the following is a specification.

My invention relates to that type of circular knitting machine having cylinder needles and dial needles for making rib fabric in which the cylinder and dial are held in fixed position relatively to each other whether the parts rotate or are stationary, the holding means consisting of dogs between the needle cylinder and dial, one of which is on the cylinder and the other of which is on the dial and between which the fabric passes on its way to the takeup.

The invention relates particularly to this driving or holding dog connection, my object being to provide a bearing or contact between these dogs having an extended surface, all parts of which will be effective under all conditions in either transmitting the driving force or in holding the dial in proper relation to the cylinder for the proper indexing of the two sets of needles.

The invention consists in the features of combination and arrangement of parts hereinafter described and particularly pointed out in the claims.

Figure 1:
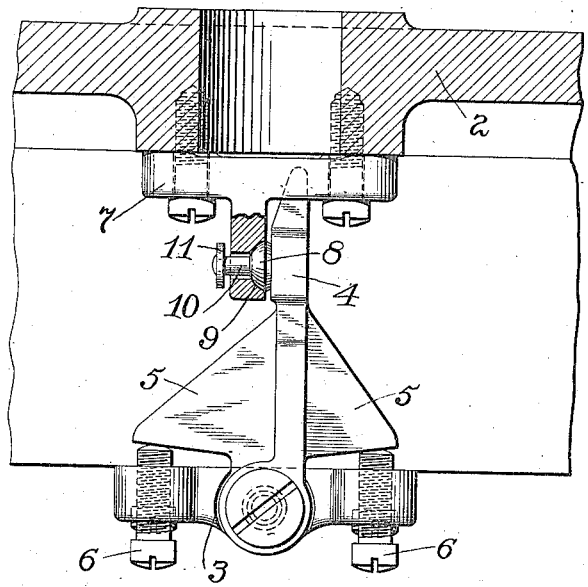
Figure 2:
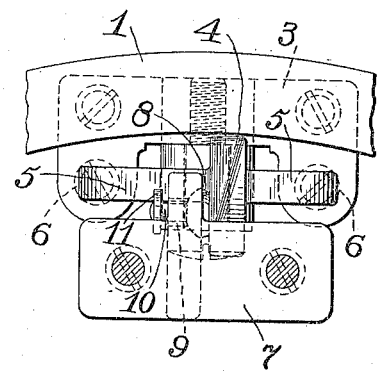
Figure 3:
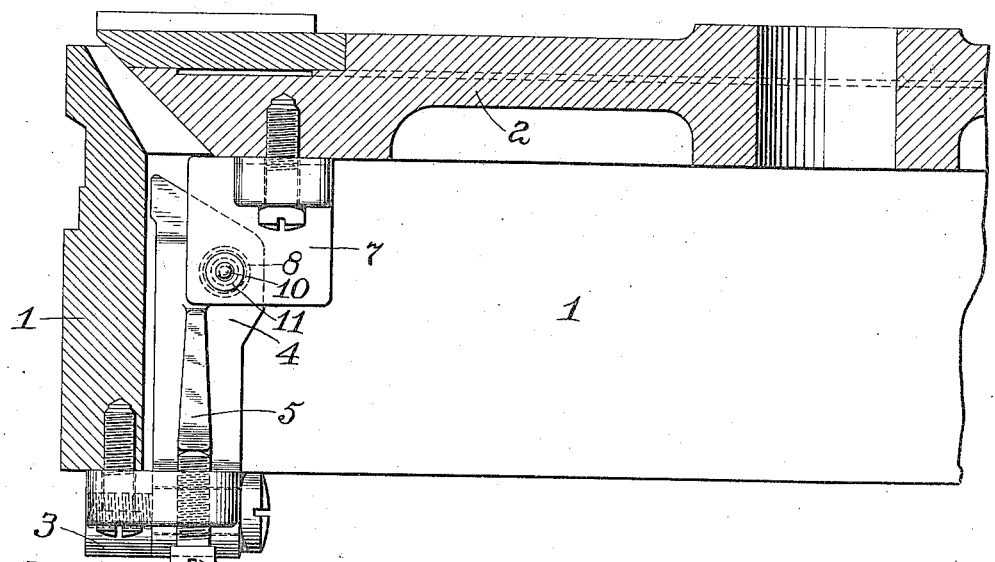

In the accompanying drawings: Figure 1 is a view of a portion of the inner face of the needle cylinder showing the cylinder dog attached thereto and showing the dial dog in section. Fig. 2 is a plan view of the dog arrangement. Fig. 3 is a sectional view.

My invention may be carried out in connection with various forms and constructions of dogs. In order to exemplify my invention I have chosen to show it in connection with that form of dog arrangement disclosed in Letters Patent of the United States, granted to George L. Ballard No. 1,101,388 but it will be understood that the invention may be applied as just stated to other forms of driving or holding dogs.

In these drawings 1 indicates the needle cylinder, 2 the needle dial, these being of any ordinary form. To the bottom of the needle cylinder a bracket 3 is attached to which is pivoted the cylinder dog 4, this extending upwardly within the cylinder and having laterally extending wings or bearings 5 borne upon by adjusting screws 6 extending through the bracket 3. The upper end of the cylinder dog has its lateral face opposite the face of the dial dog 7 which may be attached to the dial in any suitable way, either fixed or movable. The fabric as in former practice must pass down between the contacting or opposing faces of dogs and it therefore becomes important that means be provided whereby the whole extent of the contacting or opposing surfaces of the cylinder and dial dogs shall be effective at all times in order to distribute the pressure or bearing strain over all portions of these surfaces and with equal force.

In the use of prior forms of dogs great difficulty has been experienced because the opposing surfaces have been relatively fixed. Careful fitting has been necessary in order to procure an approximation of an equal distribution of the bearings between these parts, for it will be clear that if these opposing surfaces bear at one point and are free at another point all of the pressure will come upon the fabric at the first named points and damage to the fabric and cutting through thereof will result. Furthermore it has been necessary to adjust the dogs in accordance with the thickness of the fabric passing between them, one adjustment being necessary for the lighter fabrics and a different adjustment being necessary for the heavier fabrics. It will be readily seen that when the dogs are adjusted for one thickness of fabric to get the proper amount of contact and a substantially equal pressure throughout an extended contact surface, this contact surface would be reduced when the dogs are adjusted to take a different thickness of fabric. The object of securing a bearing over an extended surface is to prevent making lines or streaks in the fabric as it passes between the dogs and even when the utmost care is exercised in fitting or adjusting the dogs, these streaks or lines will appear. Furthermore it is necessary to stop the machine very quickly to prevent the work from running off the needles when the yarn fails or breaks and stop motion mechanism has been provided employing a brake to stop the machine suddenly and this sudden stop of the machine brings extraordinary pressure upon the fabric lying between the dogs, resulting at times in tendency to cutting holes in the fabric and where the area of contact surface is small between the dogs this cutting of holes in the fabric is particularly liable to occur. In order to overcome the above difficulties, I provide an arrangement whereby the opposing contact faces of the dogs will remain effective over their entire extended surfaces under all conditions. For this purpose, I provide a self compensating or adjusting contact member on one or both of the dogs and this member provides the contact face. This member is shown at 8 and while it may assume various forms, in the particular construction shown it consists of a semi-spherical body seated in a semi-spherical socket 9 in one of the dogs and having a plain flat face opposing the contact face of the other dog, the member has a shank 10 extending through an opening in the dog, the said shank having any suitable form of head or nut 11 attached to its outer end to maintain the contact member in position. This head may be simply a disk riveted to the shank and there is sufficient looseness or play between the inner face of this head or nut and the face of the dog to allow the semi-spherical body self adjustment so that its extended contact face will assume a parallel relation to the opposing contact face of the other dog under all conditions of adjustment of the dogs for receiving different thicknesses of fabric. This self adjusting member or contact may be arranged on either dog or on both of them.

The invention may also be used in connection with a movable dog such as shown in the application of George L. Ballard Serial Number 1402 of 1915.

What I claim is:

1. In a circular knitting machine, a needle cylinder, a dial, driving or holding dogs one on the cylinder and one on the dial between which the fabric passes, one of said dogs being self adjusting to maintain its flat contact face parallel with the opposing flat face of the other dog to secure a distribution of the pressure substantially equal over said faces, substantially as described.

2. In combination with a needle cylinder and dial, driving or holding dogs between them between which the fabric must pass and a self adjusting flat-faced bearing or contact member on one dog maintaining its flat contact face or surface substantially parallel with the opposing flat face or surface of the other dog to bear on the fabric with substantially equal pressure throughout the said flat bearing surfaces, substantially as described.

3. In combination in a circular knitting machine a needle cylinder, a needle dial, driving or holding dogs one on the cylinder and one on the dial, each of said dogs having a flat contact face, means for securing a relative adjustment between the said dogs, one of the said dogs being self adjusting to maintain its contact face substantially parallel with the contact face of the opposing dog, substantially as described.

4. In combination in a circular knitting machine a needle cylinder, a dial, driving or holding dogs between the cylinder and dial, one of said dogs having a semi-spherical member seated in a semi-spherical socket of the dog and having a flat contact face, said member being self adjustable to maintain its contact face substantially parallel with the flat contact face of the opposing dog.

5. In combination with a needle cylinder and dial, driving or holding dogs between them and between which dogs the fabric must pass, one of said dogs having a semi-spherical member seated in a semi-spherical socket therein, a shank on said semi-spherical member loosely mounted in the dog and a head on said shank loosely mounted with respect to the main body of the dog to permit self adjustment of the semi-spherical body, substantially as described.

FRANK B. WILDMAN.

Witnesses:
E. R. ROBERTS,
OWEN BALLARD.

Copies of this patent may be obtained for five cents each, by addressing the "Commissioner of Patents, Washington, D. C."